(12) United States Patent
Page et al.

(10) Patent No.: US 12,681,793 B2
(45) Date of Patent: Jul. 14, 2026

(54) SYSTEM AND METHOD FOR AI BASED INCIDENT IMPACT AND ROOT CAUSE ANALYSIS

(71) Applicant: BigPanda, Inc., Redwood City, CA (US)

(72) Inventors: Alexander Page, Orlando, FL (US); Blair Sibille, New York, NY (US); Jason Andrew Walker, Victor, MT (US)

(73) Assignee: BigPanda, Inc., Redwood City, CA (US)

( * ) Notice: Subject to any disclaimer, the term of this patent is extended or adjusted under 35 U.S.C. 154(b) by 23 days.

(21) Appl. No.: 18/428,840

(22) Filed: Jan. 31, 2024

(65) Prior Publication Data

US 2025/0245091 A1     Jul. 31, 2025

(51) Int. Cl.
*G06F 11/00* (2006.01)
*G06F 11/07* (2006.01)

(52) U.S. Cl.
CPC .................................. *G06F 11/079* (2013.01)

(58) Field of Classification Search
CPC ............... G06F 11/079; G06F 11/0766; G06F 11/0769; G06F 11/0775; G06F 11/0751; G06N 20/00
See application file for complete search history.

(56) References Cited

U.S. PATENT DOCUMENTS

| | | | | |
|---|---|---|---|---|
| 8,661,291 | B2 * | 2/2014 | Li ........................ | G06F 11/3476 |
| | | | | 714/48 |
| 9,049,105 | B1 * | 6/2015 | Feinstein .............. | H04L 41/069 |
| 9,881,017 | B2 * | 1/2018 | Wijayaratne .......... | G06F 16/178 |
| 10,108,634 | B1 * | 10/2018 | Pal ........................... | H04L 63/20 |
| 11,556,577 | B2 * | 1/2023 | Carasso ................. | H04L 67/10 |
| 12,475,143 | B2 * | 11/2025 | Pham ...................... | G06F 18/23 |
| 12,487,874 | B1 * | 12/2025 | Engel ................. | G06F 11/0769 |
| 12,487,875 | B1 * | 12/2025 | Côrte-Real ......... | G06F 11/0769 |
| 2017/0075744 | A1 * | 3/2017 | Deshpande ......... | H04L 41/0631 |
| 2022/0107859 | A1 * | 4/2022 | Choudhary ......... | G06F 11/0778 |
| 2022/0156247 | A1 * | 5/2022 | Gururaj ................... | G06F 16/35 |
| 2023/0016199 | A1 * | 1/2023 | Jividen ................ | H04L 41/064 |
| 2023/0377732 | A1 * | 11/2023 | Raines ................... | G16H 10/20 |

(Continued)

OTHER PUBLICATIONS

Microsoft, "Estimate Azure Virtual Desktop Monitoring Costs," webpage<https://learn.microsoft.com/pdf?url=https%3A%2F%2Flearn.microsoft.com%2Fen-us%2Fazure%2Fvirtual-desktop%2Ftoc.json>, Jun. 20, 2025, retrieved from the Internet Jan. 22, 2026.

*Primary Examiner* — Jonathan D Gibson

(74) *Attorney, Agent, or Firm* — M&B IP Analysts, LLC

(57) ABSTRACT

A system and method for reducing data record processing in incident report generation is provided. The method includes: accessing a plurality of event records, each event record generated based on an event in a computing environment; parsing each event record based on a predetermined data field; extracting from each predetermined data field a data value; correlating a group of event records of the plurality of event records based on at least an extracted data value; generating an incident data record based on the extracted data values of the correlated group of event records; generating a prompt based on the incident data record; and generating an incident report by configuring a large language model (LLM) to execute the generated prompt.

21 Claims, 7 Drawing Sheets

(56) References Cited

U.S. PATENT DOCUMENTS

| 2024/0264890 | A1* | 8/2024 | Lei | G06F 11/0778 |
| 2024/0411752 | A1* | 12/2024 | Prabhakar | H04L 41/0895 |
| 2025/0130884 | A1* | 4/2025 | Wong | G06N 3/0455 |
| 2025/0245091 | A1* | 7/2025 | Page | G06F 11/079 |
| 2025/0245092 | A1* | 7/2025 | Gallagher, Jr. | G06F 11/0793 |
| 2025/0307101 | A1* | 10/2025 | Tzoref-Brill | G06F 40/35 |

* cited by examiner

SYSTEM AND METHOD FOR AI BASED INCIDENT IMPACT AND ROOT CAUSE ANALYSIS

TECHNICAL FIELD

The present disclosure relates generally to big data analytics and specifically to enhancing root cause analysis of incidents based on artificial intelligence.

BACKGROUND

Computing environments, by virtue of their operation, generate a tremendous amount of data. Such data is generated, for example, for example by logging communication events between a first resource in a computing and a second resource in the computing environment.

For example, when a load balancer directs a request to a server, the load balancer may store a record of having sent the request to the server, and the server stores a record of receiving the request.

As another example, resources can be configured to periodically report a status, such as processor usage, memory usage, network bandwidth usage, and the like. A computing environment may be configured to store such reports.

As yet another example, various resources, monitors, agents, etc. can be configured to generate alerts based on a status of resources. For example, a server can be configured to generate an alert when processor usage exceeds some predetermined threshold.

These records, alerts, and the like, form a large body of information, which can be useful to monitor. For example, monitoring such events can lead to detecting resources which are malfunctioning, resulting in remediating the problem and increasing 'uptime' for a computing environment.

However, this is easier said than done. There is a large amount of information, and sifting through it is an impossible task for a human, and a hard one for a computer processor.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include accessing a plurality of event records, each event record generated based on an event in a computing environment. Method may also include parsing each event record based on a predetermined data field. Method may furthermore include extracting from each predetermined data field a data value. Method may in addition include correlating a group of event records of the plurality of event records based on at least an extracted data value. Method may moreover include generating an incident data record based on the extracted data values of the correlated group of event records. Method may also include generating a prompt based on the incident data record. Method may furthermore include generating an incident report by configuring a large language model (LLM) to execute the generated prompt. Other embodiments of this aspect include corresponding computer systems, apparatus, and computer programs recorded on one or more computer storage devices, each configured to perform the actions of the methods.

Implementations may include one or more of the following features. Method may include: generating the prompt further based on the incident data record and context data of a data source, where the data source generated a portion of the correlated group of event records. Method may include: storing in the incident data record only the extracted data values of the correlated group of event records. Method may include: generating the prompt further based on a prompt template, the prompt template including an input which, when executed by the LLM, outputs any one of: an incident title, an incident summary, a root cause analysis, a root cause reasoning, and a combination thereof. Method may include: generating the incident title, the incident summary, the root cause analysis, and root cause reasoning, utilizing a first LLM; and generating a summarized: incident title, incident summary, root cause analysis, root cause reasoning, and a combination thereof, utilizing a second LLM. Method where the first LLM includes a first context length, and the second LLM includes a second context length. Method may include: generating the prompt for the root cause analysis based on any one of: a generated incident summary, the correlated group of event records, and a combination thereof. Method may include: generating the prompt for the root cause reasoning based on: a root cause analysis, an incident summary, the correlated group of event records, and a combination thereof. Method where the predetermined data field is a tag. Implementations of the described techniques may include hardware, a method or process, or a computer tangible medium.

In one general aspect, system may include a processing circuitry. System may also include a memory, the memory containing instructions that, when executed by the processing circuitry, configure the system to: access a plurality of event records, each event record generated based on an event in a computing environment. System may in addition parse each event record based on a predetermined data field. System may moreover extract from each predetermined data field a data value. System may also correlate a group of event records of the plurality of event records based on at least an extracted data value. System may furthermore generate an incident data record based on the extracted data values of the correlated group of event records. System may in addition generate a prompt based on the incident data record. System may moreover generate an incident report by configuring a large language model (LLM) to execute the generated prompt. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate the prompt further based on the incident data record and context data of a data source, where the data source generated a portion of the correlated group of event records. System where the memory contains further instructions which when executed by the processing circuitry further configure the system to: store in the incident data record only the extracted data values of the correlated group of event records. System where the memory contains further instructions which when executed by the processing circuitry further configure the system to: generate the prompt further based on a prompt template, the prompt template including an input which, when executed by the LLM, outputs any one of: an incident title, an incident summary, a root cause analysis, a root cause reason, and a combination thereof. System where the memory contains further instructions which when executed by the processing circuitry further configure the system to: generate the incident title, the incident summary, the root cause analysis, and root cause reasoning, utilizing a first LLM; and generate a summarized: incident title, incident summary, root cause analysis, root cause reason, and a combination thereof, utilizing a second LLM. System where the first LLM includes a first context length, and the second LLM includes a second context length. System where the memory contains further instructions which when executed by the processing circuitry further configure the system to: generate the prompt for the root cause analysis based on any one of: a generated incident summary, the correlated group of event records, and a combination thereof. System where the memory contains further instructions which when executed by the processing circuitry further configure the system to: generate the prompt for the root cause reasoning based on: a root cause analysis, an incident summary, the correlated group of event records, and a combination thereof. System where the predetermined data field is a tag. Implementations of the described techniques may include hardware, a method or process, or a computer tangible medium.

In one general aspect, non-transitory computer-readable medium may include one or more instructions that, when executed by one or more processors of a device, cause the device to: access a plurality of event records, each event record generated based on an event in a computing environment; parse each event record based on a predetermined data field; extract from each predetermined data field a data value; correlate a group of event records of the plurality of event records based on at least an extracted data value; generate an incident data record based on the extracted data values of the correlated group of event records; generate a prompt based on the incident data record; and generate an incident report by configuring a large language model (LLM) to execute the generated prompt. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
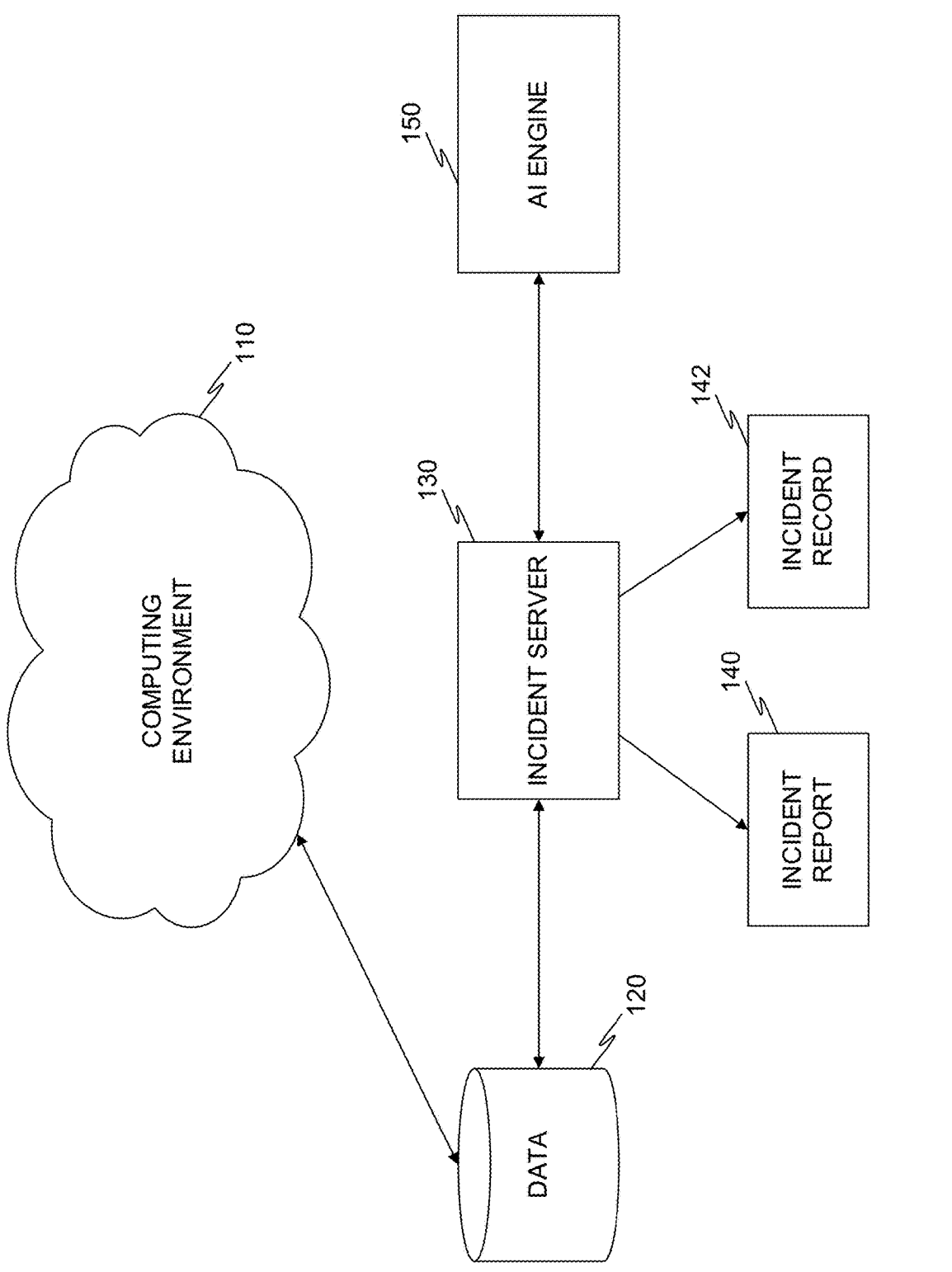
FIG. 1 is an example schematic illustration of a network diagram including an event management server, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a network diagram including an event management server, implemented in accordance with an embodiment. In an embodiment, a computing environment 110 includes a plurality of entities. In some embodiments, the computing environment 110 is a cloud computing environment, an on-prem computing environment, a networked computing environment, a hybrid computing environment, a combination thereof, and the like.

For example, according to an embodiment, a computing environment 110 includes a virtual private cloud (VPC), a virtual network (VNet), a virtual private network (VPN), a subnet, a combination thereof, and the like. In certain embodiments, a cloud computing environment is implemented on a cloud computing infrastructure, such as Amazon® Web Services (AWS), Google® Cloud Platform, Microsoft® Azure, and the like.

According to an embodiment, an entity is, for example, a resource, a principal, various combinations thereof, and the like. In an embodiment, a resource is a virtual instance, such as a virtual machine, a software container, a serverless function, a combination thereof, and the like. In certain embodiments, a resource exposes a hardware resource, a virtual resource, and the like, of the computing environment, for use by a principal.

In some embodiments, a principal is an entity which is authorized to initiate actions in the computing environment 110. For example, according to an embodiment, a principal is a user account, a service account, a user group, a user role, a local account, an administrator account, various combinations thereof, and the like.

According to an embodiment, the computing environment 110 is configured to generate records of actions, events, and the like, initiated, performed, etc., in the computing environment 110. For example, in an embodiment, a first resource (e.g., a load balancer) is configured to communicate with a second resource (e.g., a web server). In some embodiments, each resource is configured to write a record for every action performed, such as sending a communication from the first resource to the second resource, receiving a communication by the second resource from the first resource, initiating a user account, updating privilege of a user account, writing to a bucket, accessing a log, etc.

In an embodiment, the computing environment 110, a resource, a principal, a combination thereof, and the like, are configured to write events, records, etc. to a data store 120. In certain embodiments, the data store 120 is implemented as a bucket which is configured to store thereon events received from, for example, a serverless function deployed in the computing environment 110. In an embodiment, the data store 120 is a managed service (e.g., SaaS), such as AWS CloudTrail®.

In some embodiments, the data store 120 includes a network log, a cloud log, an identity and access management (IAM) log, a combination thereof, and the like. In some embodiments, a log includes a plurality of data records. For example, a data record includes data values which pertain to a specific event, action, and the like, performed in the computing environment, to the computing environment, etc. In some embodiments, a data record includes a plurality of data fields, each data field storing a value.

According to an embodiment, a data record is parsed to extract a data field value therefrom. In an embodiment, the data record is parsed to extracted values only from predetermined data fields. In certain embodiments, a predetermined field identifier is determined prior to extracting data values from a data record. For example, in an embodiment, a data field identifier is defined by a tag, e.g., 'machine_id'. In such an example embodiment, data records are parsed to identify the predetermined tag (e.g., the 'machine_id') tag, and a value in the data record which corresponds to the tag is extracted therefrom.

In certain embodiments, an event management server 130 is configured to access a data store 120 and extract data values from data records stored thereon, or otherwise accessible thereto. In an embodiment, an event management server 130 is configured to generate an incident record 142. In some embodiments, the incident record 142 includes data values extracted from a plurality of data records.

In some embodiments, the event management server 130 is configured to generate an incident record 142 based on a predetermined heuristic, rule, policy, combination thereof, and the like. For example, in an embodiment, the event management server 130 is configured to correlate a plurality of events into an incident record 142. In some embodiments, a plurality of incidents are correlated based on a tag (e.g., a data field), a plurality of tags, a time window, a time frame, a combination thereof, and the like.

In an embodiment, the event management server 130 is further configured to generate an incident report 140. In certain embodiments, the incident report 140 is generated based on the incident record 142, the plurality of events which are correlated to the incident record 142, a combination thereof, and the like.

According to some embodiments, the event management server 130 is configured to generate an input for an artificial intelligence (AI) engine 150. In an embodiment, the AI engine includes a large language model (LLM). In some embodiments, the LLM is OpenAI® GPT, Google® PaLM, Meta® LLAMA, and the like.

In certain embodiments, the event management server 130 is configured to generate the input for the AI engine 150 as a prompt. In some embodiments, event management server is configured to generate the prompt based on a predefined template.

For example, in an embodiment, the event management server 130 is configured to generate a prompt based on a plurality of correlated events and provide the generated prompt to an LLM of an AI engine 150. In some embodiments, the prompt, when processed by the LLM, configures the AI engine 150 to generate an output. In an embodiment, the generated output is utilized in generating an incident report 140.

In some embodiments, an incident report 140 includes an incident summary, a root cause analysis, a root cause analysis reasoning, a combination thereof, and the like. In an embodiment, the incident report 140 is stored as a data file, data record, and the like. In some embodiments, the incident report 140 is further generated based on a template, a plurality of correlated events, an output of an LLM, a combination thereof, and the like.

Figure 2:
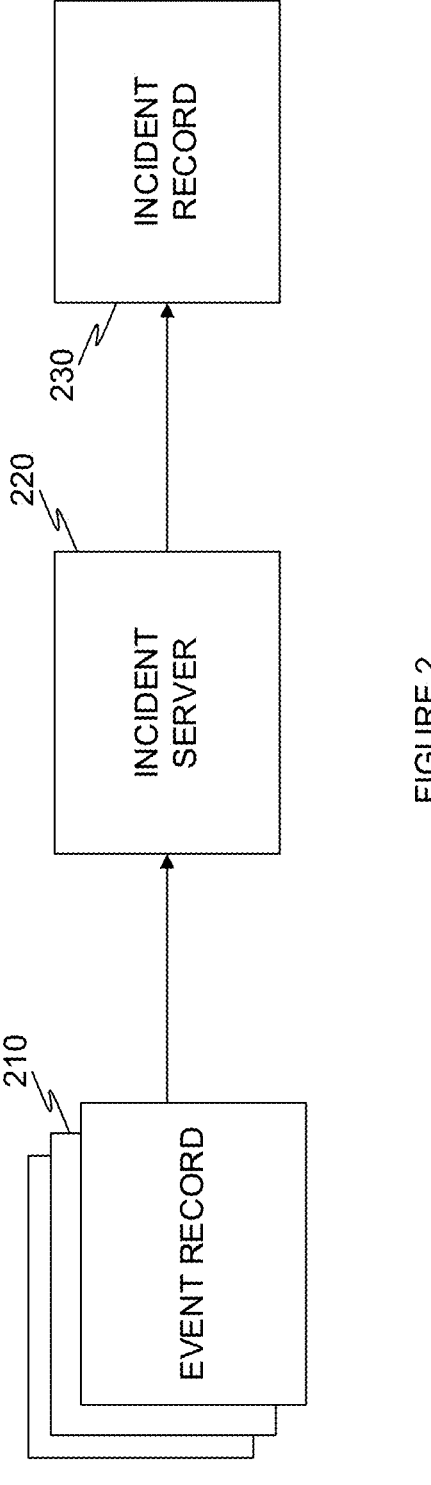
FIG. 2 is an example schematic illustration of a data flow for incident record generation, implemented in accordance with an embodiment.

FIG. 2 is an example schematic illustration of a data flow for incident record generation, implemented in accordance with an embodiment. According to some embodiments, a plurality of event records 210 are accessed. In an embodiment, the plurality of event records 210 are records of events stored in a data log. In some embodiments, an event is stored as a single line of text, hypertext, markup language, a combination thereof, and the like, for example in a log.

In an embodiment, an event record includes a plurality of tags, data fields, and the like, which are utilized in identifying data values. For example, in an embodiment, a 'destination' tag is followed by a value for an IP address (e.g., '128.0.0.1'). In some embodiments, a plurality of data fields are associated with a single tag. For example, according to an embodiment, a first event has a 'dest' data field, a second event has a 'destination' data field, etc., each of which is associated with a 'destination' tag.

In some embodiments, an event management server 220 is configured to receive the plurality of events 210. In certain embodiments, the event management server 220 is configured to access, receive, extract, a combination thereof, and the like, an event record from a data store, a network log, a cloud log, and the like.

In certain embodiments, the event management server 220 is configured to generate an incident record 230 from the plurality of event records 210. In some embodiments, the event management server 220 is configured to correlate events of the plurality of events records 210. In an embodiment, a first event record and a second event record are correlated based on a data field, tag, and the like, such as any one of: a workload name, a timestamp, a range of time, an event type, a support ticket type, a unique identifier, a host name, an event record source, an event description, a combination thereof, and the like.

In certain embodiments, the event management server 220 is configured to correlate events based on a plurality of data fields (tags, and the like). In an embodiment, the event management server 220 is configured to correlate events based on values of data fields.

In an embodiment, the event management server 220 is configured to generate an incident record 230 based on a plurality of correlated events. In some embodiments, the correlated events are a subset of the plurality of event records 210.

According to an embodiment, an incident record 230 is a data record which includes data values extracted from the correlated event records. In some embodiments, generating an incident record 230 from the correlated event records is advantageous, as storing an incident record 230 requires less storage space than storing all of the correlated event records. This is due, for example, to extracting only values only of predetermined data fields. Thus, the incident record 230 stores therein less data than the correlated event records together.

Figure 3:
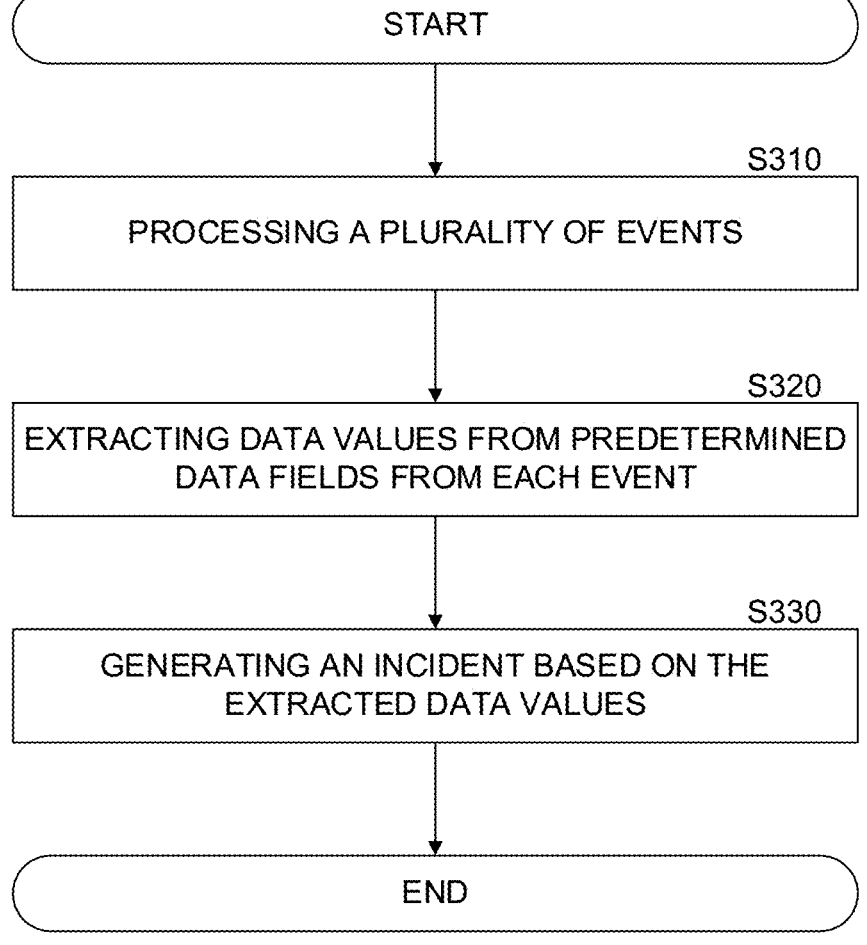
FIG. 3 is an example flowchart of a method for generating an incident data record based on a plurality of event records, implemented in accordance with an embodiment.

FIG. 3 is an example flowchart of a method for generating an incident data record based on a plurality of event records, implemented in accordance with an embodiment. In some embodiments, generating an incident data record (also referred to as 'incident' or 'incident record') is performed by an event management server, such as described in more detail herein. In some embodiments, the event management server is configured to generate an incident record by utilizing an AI engine, for example having an LLM.

In an embodiment, the AI engine, the event management server, and the like, are configured to provide context data to the LLM. In some embodiments, context data includes a data schema, metadata, and the like. In an embodiment, the event management server is configured to generate a prompt using retrieval augmented generation (RAG). In certain embodiments, generating a prompt using RAG includes generating a prompt based on context data. In an embodiment, context data is retrieved from a data store.

At S310, a plurality of event records are processed. In an embodiment, a plurality of event records (also referred to as 'events') are received. In certain embodiments, the events are received as a stream of events. In some embodiments, an event log, a cloud log, a network log, a bucket, a cloud-based storage, combinations thereof, and the like, are accessed to retrieve therefrom event records.

In an embodiment, accessing a store of event records includes receiving an access credentials, such as a token, a username, a password, a combination thereof, and the like, where the credentials provide temporary access, permanent access, etc. In an embodiment, event records are received (or otherwise accessed) continuously, periodically, dynamically, adaptively, and the like.

In an embodiment, dynamic access includes accessing event records at a pace which changes over time. In some embodiments, adaptive access includes changing access times based on, for example, a number of records. As an example, in an embodiment, at a first rate of access, 100 event records are fetched. The rate of access is decreased, until a second rate of access, at which a number of events fetched exceeds a threshold.

In an embodiment, an event record is an alert, a record of communication between resources (e.g., machines, virtual instances, and the like in a computing environment), a record of communication between principals, a record of creating a principal, a failure of a component of the computing environment, various combinations thereof, and the like.

At S320, data values are extracted from an event record. In an embodiment, an event record is parsed based on predetermined data fields. In an embodiment, an event record is parsed based on a predetermined tag. According to some embodiments, a tag includes a plurality of identifiers of data fields, each of which pertains to a same type, context, and the like, of data. For example, a tag 'resource' is associated with data fields 'id', 'name', 'machine', and the like, according to an embodiment.

In certain embodiments, a data field is an indicator, for example extracted from an event record. In some embodiments, the event record is parsed to detect keywords, key phrases, and the like. For example, where an event record includes 'ec2-instance_id-region', the parsed terms of 'ec2' indicate that the computing environment is Amazon® Web Services (AWS), and that 'instance_id' is an identifier of a virtual instance deployed in a region 'region' of AWS.

In some embodiments, events are correlated. In certain embodiments, an event management server is configured to correlate a plurality of events. In an embodiment, correlated events correspond to an incident. For example, according to an embodiment, an incident is a loss of service, which corresponds to a first event indicating a failure of a load balancer, a second event indicating a first server is not responding, a third event indicating a second server is not responding, etc. In an embodiment, events are correlated based on a timestamp, a data field, an indicator, metadata, data values, and the like, of event records.

At S330, an incident record is generated. In an embodiment, an event management server is configured to generate an incident record based on data extracted from a plurality of events. In some embodiments, it is advantageous to maintain an incident record, as the incident record contains therein only data that is predetermined to be relevant to an incident. Thus, the amount of data is reduced, which allows to store multiple incidents for a longer time (e.g., using the same amount of storage), allows searching through incident records faster (i.e., searching a smaller data set is faster than searching through a larger data set), etc.

In some embodiments, the incident record is further generated based on a result from an AI engine. In certain embodiments, a plurality of incidents are provided to an AI engine in order to determine which events are correlated to a single incident. In some embodiments, an event is related to a plurality of incidents.

Figure 4:
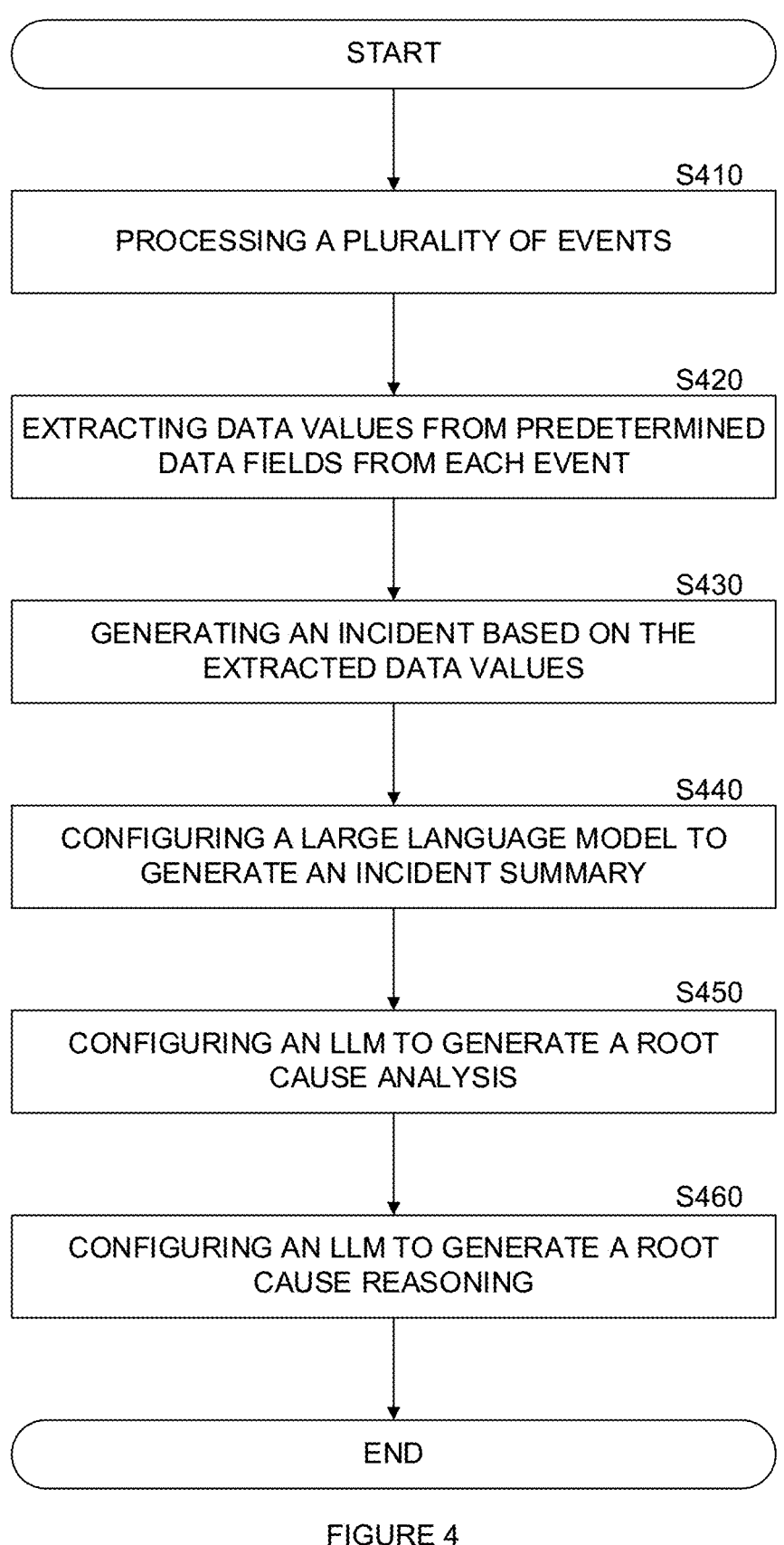
FIG. 4 is an example flowchart of incident summary generation, implemented in accordance with an embodiment.

FIG. 4 is an example flowchart of incident summary generation, implemented in accordance with an embodiment. According to an embodiment, correlating a plurality of event records into a single incident is useful, however outputting to a user a plurality of data records (e.g., the correlated event records) can be a lot, especially if an incident includes thousands, tens of thousands, etc. alerts, events, and the like.

It is therefore advantageous in an embodiment, to provide an incident summary, including a root cause analysis, and a root cause reasoning to explain in terms that can be easily understood by a human operator, what the incident indicates, what is a possible root cause, and why this is suspected as the root cause.

At S410, a plurality of events is processed. In an embodiment, a plurality of event records (also referred to as 'events') are received. In certain embodiments, the events are received as a stream of events. In some embodiments, an event log, a cloud log, a network log, a bucket, a cloud-based storage, combinations thereof, and the like, are accessed to retrieve therefrom event records.

In an embodiment, accessing a store of event records includes receiving an access credentials, such as a token, a username, a password, a combination thereof, and the like, where the credentials provide temporary access, permanent access, etc. In an embodiment, event records are received (or otherwise accessed) continuously, periodically, dynamically, adaptively, and the like.

In an embodiment, dynamic access includes accessing event records at a pace which changes over time. In some embodiments, adaptive access includes changing access times based on, for example, a number of records. As an example, in an embodiment, at a first rate of access, 100 event records are fetched. The rate of access is decreased, until a second rate of access, at which a number of events fetched exceeds a threshold.

In an embodiment, an event record is an alert, a record of communication between resources (e.g., machines, virtual instances, and the like in a computing environment), a record of communication between principals, a record of creating a principal, a failure of a component of the computing environment, various combinations thereof, and the like.

At S420, data values are extracted from an event record. In an embodiment, an event record is parsed based on predetermined data fields. In an embodiment, an event record is parsed based on a predetermined tag. According to some embodiments, a tag includes a plurality of identifiers of data fields, each of which pertains to a same type, context, and the like, of data. For example, a tag 'resource' is associated with data fields 'id', 'name', 'machine', and the like, according to an embodiment.

In certain embodiments, a data field is an indicator, for example extracted from an event record. In some embodiments, the event record is parsed to detect keywords, key phrases, and the like. For example, where an event record includes 'ec2-instance_id-region', the parsed terms of 'ec2' indicate that the computing environment is Amazon® Web Services (AWS), and that 'instance_id' is an identifier of a virtual instance deployed in a region 'region' of AWS.

In some embodiments, events are correlated. In certain embodiments, an event management server is configured to correlate a plurality of events. In an embodiment, correlated events correspond to an incident. For example, according to an embodiment, an incident is a loss of service, which corresponds to a first event indicating a failure of a load balancer, a second event indicating a first server is not responding, a third event indicating a second server is not responding, etc. In an embodiment, events are correlated based on a timestamp, a data field, an indicator, metadata, data values, and the like, of event records.

At S430, an incident record is generated. In an embodiment, an event management server is configured to generate an incident record based on data extracted from a plurality of events. In some embodiments, it is advantageous to maintain an incident record, as the incident record contains therein only data that is predetermined to be relevant to an incident. Thus, the amount of data is reduced, which allows to store multiple incidents for a longer time (e.g., using the same amount of storage), allows searching through incident records faster (i.e., searching a smaller data set is faster than searching through a larger data set), etc.

In some embodiments, the incident record is further generated based on a result from an AI engine. In certain embodiments, a plurality of incidents are provided to an AI engine in order to determine which events are correlated to a single incident. In some embodiments, an event is related to a plurality of incidents.

At S440, an incident summary is generated. In an embodiment, generating an incident summary includes generating a prompt for a large language model (LLM). In some embodiments, an event management server is configured to generate a prompt for an LLM, for example based on a predefined template. In some embodiments, the template is modified based on context data, metadata, and the like, associated with events correlated to the incident.

For example, in an embodiment, an event management server is configured to modify a prompt template based on context data, metadata, and the like, of a data source from which the correlated events are received. In an embodiment, the event management server is further configured to generate a prompt for an LLM based on the modified prompt, wherein the generated prompt includes the incident record data (i.e., data which was extracted from the correlated event records).

In an embodiment, the prompt, when processed by a machine, virtual instance, and the like, utilizing an LLM, configures the machine to generate an output which includes an incident summary which is presented in natural language. In an embodiment, the output is a textual output.

LLMs are models which have a fixed-size input, also known as a context length. For example, an LLM includes a 16 k (i.e., 16,000) context length of tokens, 32 k, 64 k, 128 k, and the like. In some embodiments, a publicly available LLM which is provided as a Software as a Service (SaaS) utilizes a single model that has different context lengths provided at different costs (e.g., 32 k is cheaper than 64 k, and more expensive than 16 k).

It is therefore advantageous, according to an embodiment, to provide the LLM an incident record having only values of predetermined data fields, rather than provide all the correlated event records as an input.

In an embodiment, a first advantage is utilizing the shortest possible context length, which leads to a reduction of compute usage (also translating to a reduction in cost). In an embodiment, a second advantage is effectively compressing incident data to only the relevant data, thus the longest context length of the model is not exceeded (or rarely exceeded), even for incidents which include a large number of correlated event records.

According to an embodiment, utilizing an incident record in place of utilizing the plurality of correlated event records as an input for the LLM reduces the number of incidents for which an incident summary cannot be produced because of a large number of events.

In certain embodiments, where a generated incident record includes data from a plurality of correlated events resulting in data which exceeds the context length of the LLM, a plurality of secondary incident records are generated based on the correlated events. For example, in an embodiment, an event management server is configured to generate a first secondary incident record based on a first group of correlated event records, and a second secondary incident record base on a second group of correlated event records. In some embodiments, a third group of correlated event records overlaps the first group of correlated event records and the second group of correlated event records.

At S450, an incident root cause analysis is generated. In an embodiment, generating a root cause analysis includes generating a prompt for a large language model (LLM). In some embodiments, an event management server is configured to generate a prompt for an LLM, for example based on a predefined template. In some embodiments, the template is modified based on context data, metadata, and the like, associated with events correlated to the incident.

In an embodiment, the template includes an input for the LLM which further configures the LLM to generate an incident summary. In certain embodiments, the template further includes an input which configures the LLM to generate the root cause analysis based on the incident record and the incident summary.

For example, in an embodiment, an event management server is configured to modify a prompt template based on context data, metadata, and the like, of a data source from which the correlated events are received. In an embodiment, the event management server is further configured to generate a prompt for an LLM based on the modified prompt, wherein the generated prompt includes the incident record data (i.e., data which was extracted from the correlated event records).

In an embodiment, the prompt, when processed by a machine, virtual instance, and the like, utilizing an LLM, configures the machine to generate an output which includes a root cause analysis which is presented in natural language. In an embodiment, the output is a textual output.

LLMs are models which have a fixed-size input, also known as a context length. For example, an LLM includes a 16 k (i.e., 16,000) context length of tokens, 32 k, 64 k, 128 k, and the like. In some embodiments, a publicly available LLM which is provided as a Software as a Service (SaaS) utilizes a single model that has different context lengths provided at different costs (e.g., 32 k is cheaper than 64 k, and more expensive than 16 k).

It is therefore advantageous, according to an embodiment, to provide the LLM an incident record having only values of predetermined data fields, rather than provide all the correlated event records as an input.

In an embodiment, a first advantage is utilizing the shortest possible context length, which leads to a reduction of compute usage (also translating to a reduction in cost). In an embodiment, a second advantage is effectively compressing incident data to only the relevant data, thus the longest context length of the model is not exceeded (or rarely exceeded), even for incidents which include a large number of correlated event records.

According to an embodiment, utilizing an incident record in place of utilizing the plurality of correlated event records as an input for the LLM reduces the number of incidents for which a root cause analysis cannot be produced because of a large number of events.

In certain embodiments, where a generated incident record includes data from a plurality of correlated events resulting in data which exceeds the context length of the LLM, a plurality of secondary incident records are generated based on the correlated events. For example, in an embodiment, an event management server is configured to generate a first secondary incident record based on a first group of correlated event records, and a second secondary incident record base on a second group of correlated event records. In some embodiments, a third group of correlated event records overlaps the first group of correlated event records and the second group of correlated event records.

In some embodiments, a first LLM is provided with a prompt to generate an incident summary and a second LLM is provided with a prompt to generate a root cause analysis. In some embodiments, the first LLM includes a first context length, and the second LLM includes a second context length. In an embodiment, the first context length is longer than the second context length.

According to an embodiment, the first LLM is provided with a prompt generated at least based on correlated event records and context data, and the second LLM is provided with a prompt generated based at least on an output of the first LLM.

At S460, a root cause reasoning is generated. In an embodiment, generating a root cause reasoning includes generating a prompt for a large language model (LLM). In some embodiments, an event management server is configured to generate a prompt for an LLM, for example based on a predefined template. In some embodiments, the template is modified based on context data, metadata, and the like, associated with events correlated to the incident.

In an embodiment, the template includes an input for the LLM which further configures the LLM to generate a root cause reasoning. In certain embodiments, the template further includes an input which configures the LLM to generate the root cause reasoning based on any of: the incident record, the incident summary, the root cause analysis, and a combination thereof.

For example, in an embodiment, an event management server is configured to modify a prompt template based on context data, metadata, and the like, of a data source from which the correlated events are received. In an embodiment, the event management server is further configured to generate a prompt for an LLM based on the modified prompt, wherein the generated prompt includes the incident record data (i.e., data which was extracted from the correlated event records).

In an embodiment, the prompt, when processed by a machine, virtual instance, and the like, utilizing an LLM, configures the machine to generate an output which includes a root cause reasoning which is presented in natural language. In an embodiment, the output is a textual output.

LLMs are models which have a fixed-size input, also known as a context length. For example, an LLM includes a 16 k (i.e., 16,000) context length of tokens, 32 k, 64 k, 128 k, and the like. In some embodiments, a publicly available LLM which is provided as a Software as a Service (SaaS) utilizes a single model that has different context lengths provided at different costs (e.g., 32 k is cheaper than 64 k, and more expensive than 16 k).

It is therefore advantageous, according to an embodiment, to provide the LLM an incident record having only values of predetermined data fields, rather than provide all the correlated event records as an input.

In an embodiment, a first advantage is utilizing the shortest possible context length, which leads to a reduction of compute usage (also translating to a reduction in cost). In an embodiment, a second advantage is effectively compressing incident data to only the relevant data, thus the longest context length of the model is not exceeded (or rarely exceeded), even for incidents which include a large number of correlated event records.

According to an embodiment, utilizing an incident record in place of utilizing the plurality of correlated event records as an input for the LLM reduces the number of incidents for which a root cause analysis cannot be produced because of a large number of events.

In certain embodiments, where a generated incident record includes data from a plurality of correlated events resulting in data which exceeds the context length of the LLM, a plurality of secondary incident records are generated based on the correlated events. For example, in an embodiment, an event management server is configured to generate a first secondary incident record based on a first group of correlated event records, and a second secondary incident record base on a second group of correlated event records. In some embodiments, a third group of correlated event records overlaps the first group of correlated event records and the second group of correlated event records.

In some embodiments, a first LLM is provided with a prompt to generate an incident summary, a second LLM is provided with a prompt to generate a root cause analysis, and a third LLM is provided with a prompt to generate a root cause reasoning. In some embodiments, the first LLM includes a first context length, the second LLM includes a second context length, and the third LLM includes a second context length. In an embodiment, the first context length is longer than the second context length, and the second context length is equal to, or greater than, the third context length.

According to an embodiment, the first LLM is provided with a prompt generated at least based on correlated event records and context data, the second LLM is provided with a prompt generated based at least on an output of the first LLM, and the third LLM is provided with a prompt generated based at least on an output of the first LLM and an output of the second LLM. In an embodiment, the second LLM and the third LLM are the same LLM. In some embodiments, the first LLM, the second LLM, and the third LLM are all the same model.

Figure 5:
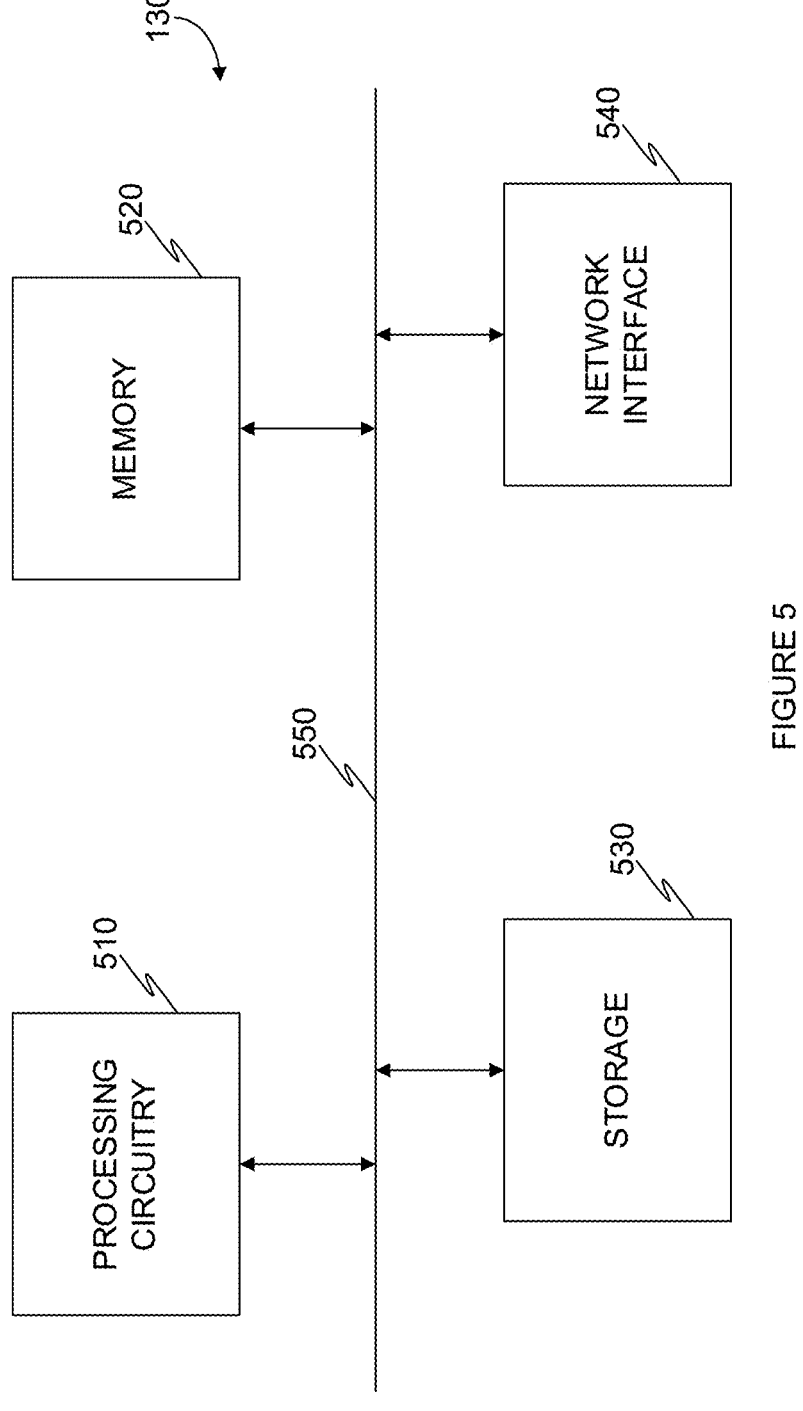
FIG. 5 is an example schematic diagram of an event management server according to an embodiment.

FIG. 5 is an example schematic diagram of an event management server 130 according to an embodiment. The event management server 130 includes, according to an embodiment, a processing circuitry 510 coupled to a memory 520, a storage 530, and a network interface 540. In an embodiment, the components of the event management server 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the event management server 130 with communication with, for example, the computing environment 110, the data store 120, the AI engine 150, and the like, according to an embodiment.

It should be understood that the embodiments described herein are not limited to the specific architecture illustrated in FIG. 5, and other architectures may be equally used without departing from the scope of the disclosed embodiments.

Furthermore, in certain embodiments the data store 120, the AI engine 150, and the like may be implemented with the architecture illustrated in FIG. 5. In other embodiments, other architectures may be equally used without departing from the scope of the disclosed embodiments.

Figure 6:
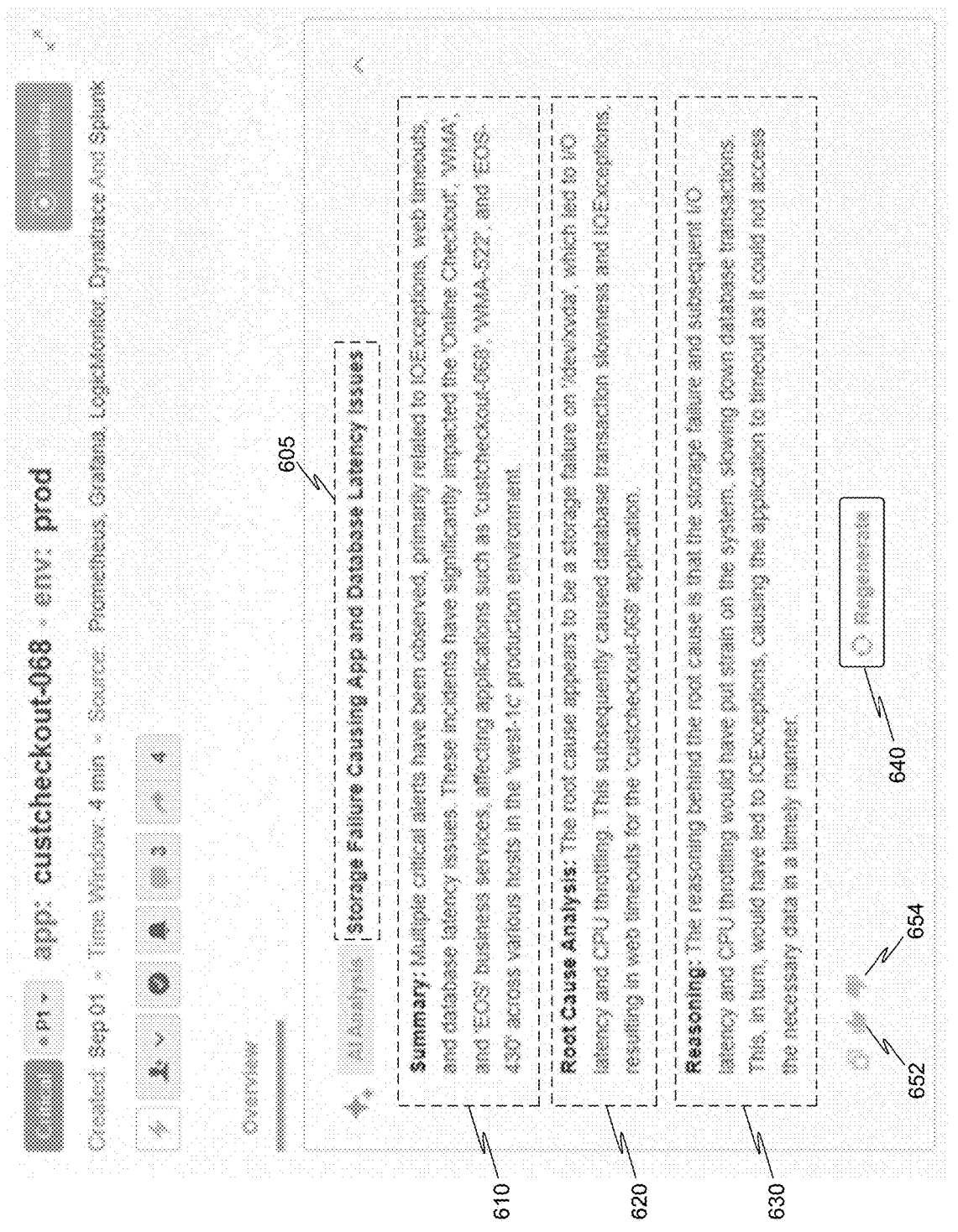
FIG. 6 is an example graphical user interface of an incident summary generated by an event management server, utilized to describe an embodiment.

FIG. 6 is an example graphical user interface of an incident summary generated by an event management server, utilized to describe an embodiment. In an embodiment, an event management server, such as the event management server 130 of FIG. 1 above, is configured to generate a graphical user interface (GUI), including various graphical and textual elements.

In an embodiment, a GUI includes an incident report generated based on an incident record. For example, in an embodiment, the incident report includes a title 605, a summary 610, a root cause analysis 620, and a root cause reasoning 630. In some embodiments, the text of the summary 610 is generated utilizing the techniques discussed in more detail above, such as in S440 of FIG. 4 above.

In certain embodiments, the text of the root cause analysis 620 is generated utilizing the techniques discussed in more detail above, such as in S450, and the text of the root cause reasoning is generated utilizing for example the techniques discussed in more detail above at S450 of FIG. 4.

In an embodiment, the GUI further includes a regenerate button 640. In some embodiments, the regenerate button 640 is an interactive graphical element, allowing to receive a user input through the graphical user interface. In certain embodiments, receiving an input from the regenerate button 640 (e.g., a mouse click on the graphical portion thereof) configures an event management server to regenerate the incident report, the incident summary, the root cause analysis, the root cause reasoning, a combination thereof, and the like.

In some embodiments, the GUI further includes an approval input 652, a disapproval input 654, a combination thereof, and the like. For example, in an embodiment, the approval input 652, the disapproval input 654, and the like, are binary toggles, having an 'on' and 'off' state.

In an embodiment, an input from a binary toggle is utilized in training an LLM which generated the incident summary, the root cause analysis, the root cause reasoning, a combination thereof, and the like. In some embodiments, the input is utilized in a reinforced learning mechanism for an AI engine.

Figure 7:
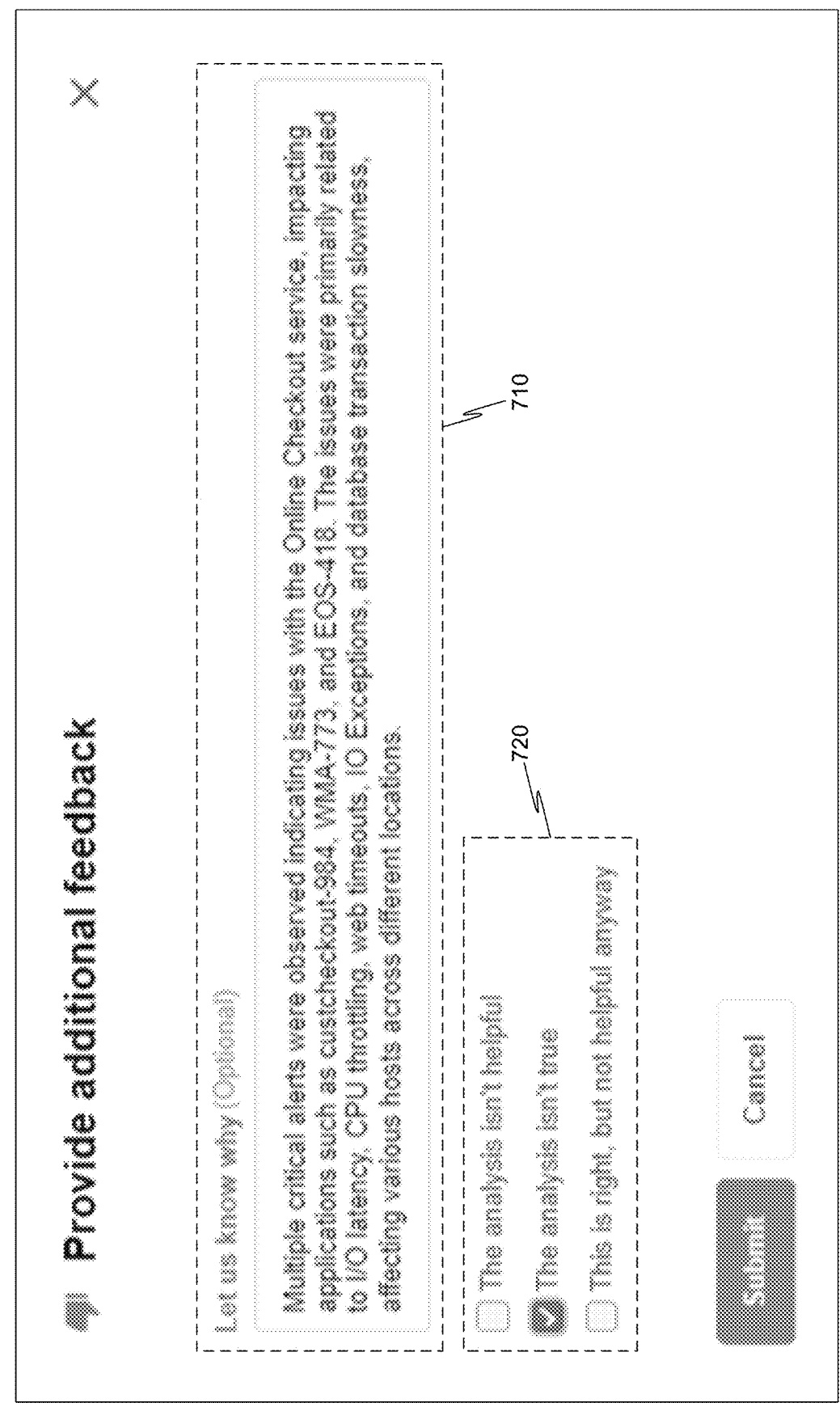
FIG. 7 is an example graphical user interface for providing input on an incident report generation, utilized to describe an embodiment.

In certain embodiments, providing an input through the disapproval input 654 configures the event management server to generate a second GUI, the second GUI allowing a user to provide inputs, such as illustrated in FIG. 7 below.

FIG. 7 is an example graphical user interface for providing input on an incident report generation, utilized to describe an embodiment. In an embodiment, the GUI is generated based on an input received from a user, for example through a primary graphical user interface, such as shown in FIG. 6 above.

In some embodiments, the GUI includes a textual input 710, for providing a text input from a user of the graphical user interface. In certain embodiments, the GUI includes a plurality of various input options. In an embodiment, an input option is optional, or mandatory. In an embodiment, the textual input 710 is limited in characters, unlimited in characters, etc.

In certain embodiments, the GUI further includes a checkbox input 720, a toggle input, and the like. For example, in an embodiment, the checkbox input 720 includes a predetermined phrase (e.g., 'The analysis isn't helpful') and a corresponding checkbox, wherein a user interacting with the checkbox (e.g., by clicking with a pointer device) configures the checkbox to a first state (e.g., checked) or a second state (e.g., unchecked), such that each input reverses the current state of the checkbox input 720.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing data record processing in incident report generation, comprising:

accessing a plurality of event records, each event record generated based on an event involving one or more resources in a computing environment;

parsing each event record based on a predetermined data field, the predetermined data field containing a data value representative of a type of feature of an event;

extracting from each predetermined data field a data value;

correlating a group of event records of the plurality of event records based on at least an extracted data value;

generating an incident data record based on the extracted data values of the correlated group of event records, wherein the incident data record is representative of an incident associated with events in the correlated group of event records;

generating a prompt based on the incident data record;

processing the generated prompt utilizing a large language model (LLM);

generating an incident report, including an incident summary and an analysis of a root cause of the incident; and outputting the incident report in textual form to a user.

2. The method of claim 1, further comprising:

generating the prompt further based on the incident data record and context data of a data source, wherein the data source generated a portion of the correlated group of event records.

3. The method of claim 1, further comprising:

storing in the incident data record only the extracted data values of the correlated group of event records.

4. The method of claim 1, further comprising:

generating the prompt further based on a prompt template, the prompt template including an input which, when executed by the LLM, outputs any one of: an incident title, an incident summary, a root cause analysis, a root cause reasoning, and a combination thereof.

5. The method of claim 4, further comprising:

generating the incident title, the incident summary, the root cause analysis, and root cause reasoning, utilizing a first LLM; and generating a summarized: incident title, incident summary, root cause analysis, root cause reasoning, and a combination thereof, utilizing a second LLM.

6. The method of claim 5, wherein the first LLM includes a first context length, and the second LLM includes a second context length.

7. The method of claim 4, further comprising:

generating the prompt for the root cause analysis based on any one of: a generated incident summary, the correlated group of event records, and a combination thereof.

8. The method of claim 4, further comprising:

generating the prompt for the root cause reasoning based on: a root cause analysis, an incident summary, the correlated group of event records, and a combination thereof.

9. The method of claim 1, wherein the predetermined data field is a tag.

10. The method of claim 1, wherein the type of feature is an identity of a resource involved in an event.

11. The method of claim 1, wherein the type of feature is a time an event occurs.

12. A system for reducing data record processing in incident report generation comprising:

a processing circuitry;

a memory, the memory containing instructions that, when executed by the processing circuitry, configure the system to:

access a plurality of event records, each event record generated based on an event involving one or more resources in a computing environment;

parse each event record based on a predetermined data field, the predetermined data field containing a data value representative of a type of feature of an event;

extract from each predetermined data field a data value;

correlate a group of event records of the plurality of event records based on at least an extracted data value;

generate an incident data record based on the extracted data values of the correlated group of event records, wherein the incident data record is representative of an incident associated with events in the correlated group of event records;

generate a prompt based on the incident data record;

process the generated prompt utilizing a large language model (LLM);

generating an incident report, including an incident summary and an analysis of a root cause of the incident; and outputting the incident report in textual form to a user.

13. The system of claim 12, wherein the memory contains further instructions which when executed by the processing circuitry further configure the system to:

generate the prompt further based on the incident data record and context data of a data source, wherein the data source generated a portion of the correlated group of event records.

14. The system of claim 12, wherein the memory contains further instructions which when executed by the processing circuitry further configure the system to:

store in the incident data record only the extracted data values of the correlated group of event records.

15. The system of claim 12, wherein the memory contains further instructions which when executed by the processing circuitry further configure the system to:

generate the prompt further based on a prompt template, the prompt template including an input which, when executed by the LLM, outputs any one of:

an incident title, an incident summary, a root cause analysis, a root cause reason, and a combination thereof.

16. The system of claim 15, wherein the memory contains further instructions which when executed by the processing circuitry further configure the system to:

generate the incident title, the incident summary, the root cause analysis, and root cause reasoning, utilizing a first LLM; and generate a summarized:

incident title, incident summary, root cause analysis, root cause reason, and a combination thereof, utilizing a second LLM.

17. The system of claim 16, wherein the first LLM includes a first context length, and the second LLM includes a second context length.

18. The system of claim 15, wherein the memory contains further instructions which when executed by the processing circuitry further configure the system to:

generate the prompt for the root cause analysis based on any one of:

a generated incident summary, the correlated group of event records, and a combination thereof.

19. The system of claim 15, wherein the memory contains further instructions which when executed by the processing circuitry further configure the system to:

generate the prompt for the root cause reasoning based on:

a root cause analysis, an incident summary, the correlated group of event records, and a combination thereof.

20. The system of claim 12, wherein the predetermined data field is a tag.

21. A non-transitory computer-readable medium storing a set of instructions for reducing data record processing in incident report generation, the set of instructions comprising:

one or more instructions that, when executed by one or more processors of a device, cause the device to:

access a plurality of event records, each event record generated based on an event involving one or more resources in a computing environment;

parse each event record based on a predetermined data field, the predetermined data field containing a data value representative of a type of feature of an event;

extract from each predetermined data field a data value;

correlate a group of event records of the plurality of event records based on at least an extracted data value;

generate an incident data record based on the extracted data values of the correlated group of event records, wherein the incident data record is representative of an incident associated with events in the correlated group of event records;

generate a prompt based on the incident data record;

process the generated prompt utilizing a large language model (LLM);

generating an incident report, including an incident summary and an analysis of a root cause of the incident; and outputting the incident report in textual form to a user.

* * * * *